United States Patent [19]
Stapp

[11] 3,890,402
[45] June 17, 1975

[54] OLIGOMERIZATION PROCESS

[75] Inventor: Paul R. Stapp, Bartlesville, Okla.

[73] Assignee: Phillips Petroleum Company, Bartlesville, Okla.

[22] Filed: Mar. 15, 1974

[21] Appl. No.: 451,475

Related U.S. Application Data

[63] Continuation-in-part of Ser. No. 405,524, Oct. 11, 1973, abandoned.

[52] U.S. Cl... 260/668 F; 260/669 P; 260/683.15 R
[51] Int. Cl............................................. C07c 3/18
[58] Field of Search .... 260/683.1, 683.15 R, 669 P, 260/668 F

[56] References Cited

UNITED STATES PATENTS

| | | | |
|---|---|---|---|
| 3,213,155 | 10/1965 | Schriesheim et al. | 260/683.15 |
| 3,488,403 | 1/1970 | Franz et al. | 260/683.1 |
| 3,723,555 | 3/1973 | Armbrust et al. | 260/668 F |
| 3,764,731 | 10/1973 | Armbrust et al. | 260/668 F |
| 3,830,863 | 8/1974 | Armbrust et al. | 260/668 F |

*Primary Examiner*—Paul M. Coughlan, Jr.

[57] ABSTRACT

Oligomerization of aliphatic and aromatic monoalkenyl compounds is carried out using elemental iodine as the catalyst and tetrahydrothiophene-1,1-dioxide as the diluent.

6 Claims, No Drawings

OLIGOMERIZATION PROCESS

This is a continuation-in-part of application Ser. No. 405,524, filed Oct. 11, 1973 now abandoned.

This invention relates to a process for oligomerization.

Many processes have been developed for the oligomerization of aliphatic and aromatic monoalkenyl compounds. Such processes generally involve high reaction temperatures, high reaction pressures and/or complex catalyst systems. What is desired is an oligomerization process involving mild reaction conditions and a simple catalyst.

It is an object of this invention to provide a novel process for oligomerization.

It is another object of this invention to provide a novel process for the oligomerization of monoalkenyl aliphatic compounds.

It is yet another object of this invention to provide a novel process for the oligomerization of monoalkenyl aromatic compounds.

Other aspects and objects will be apparent to those skilled in the art from the following description and appended claims.

In accordance with this invention, I have discovered that aliphatic and aromatic monoalkenyl compounds can be oligomerized in good yield when contacted with iodine as catalyst in the presence of tetrahydrothiopene-1,1-dioxide as diluent under oligomerization conditions.

More particularly, according to the present invention there is provided a process for the oligomerization of monoalkenyl compounds selected from the group consisting of:

A. compounds having from 4 to 20 carbon atoms per molecule characterized by the formula

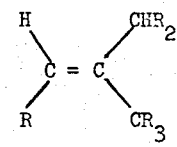

wherein each R is independently selected from the group consisting of hydrogen, alkyl, cycloalkyl and aryl; and B. compounds having from 8 to 20 carbon atoms per molecule characterized by the formula

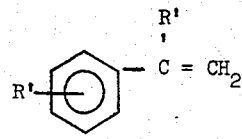

wherein each R' is individually selected from the group consisting of hydrogen, alkyl and cycloalkyl; which comprises contacting such monoalkenyl compound with a catalytic amount of elemental iodine in the presence of tetrahydrothiophene-1,1-dioxide as diluent under oligomerization conditions.

In one embodiment of this invention, there is provided a process for the oligomerization of gem-disubstituted or trisubstituted olefins having the general formula

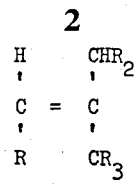

wherein R is as defined above. Presently preferred are acyclic aliphatic 1-olefins having from 4 to 10 carbon atoms per molecule. Examples of olefins useful in the process of this invention include isobutylene, 2-methyl-2-butene, 3-cyclohexyl-2-pentene, 2,3-dicyclohexyl-2,5-dimethyl-3-hexane, 1-phenyl-2-methyl-2-propene, 2-methyl-pentene-1, 2-ethylbutene-1 and the like, and mixtures thereof.

The oligomer products which can be produced by the oligomerization of olefins in accordance with this invention include dimers, trimers and higher oligomers. As used herein and in the claims, the terms "dimer" and "trimer" refer to compounds formed by the addition reaction of two or three molecules or monomer units, respectively, of a particular oligomerizable monoalkenyl hydrocarbon. The olefin oligomers are unsaturated linear oligomers.

As one example, the oligomerization of a monoalkenyl compound of the formula (A) gives a dimer having the formula

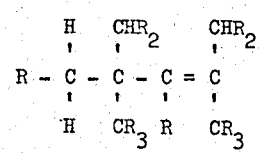

together with double bond isomers thereof.

In another embodiment of this invention there is provided a process for the oligomerization of monoalkenyl aromatic compounds having the general formula

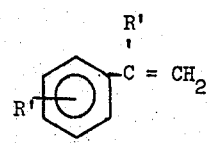

wherein R' is as defined above. Presently preferred are alpha-alkyl-substituted styrenes having from 1 to 4 carbon atoms in the alpha-alkyl substituent. Examples of alpha-substituted sytrenes useful in the process of this invention include alpha-methyl styrene, alpha-ethyl styrene, alpha-propyl styrene, alpha-butyl styrene, p-ethyl-alpha-methyl styrene, and the like, and mixtures thereof.

The oligomer products which can be produced by the oligomerization of alpha-substituted styrenes in accordance with this invention include cyclic dimers having the general formula

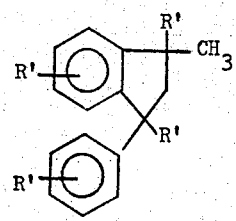

wherein R' is as defined hereinbefore.

The process generally comprises contacting the reactant hydrocarbon with a catalytic amount of elemental iodine in the presence of tetrahydrothiophene-1,1-dioxide. Iodine is employed in approximate amounts ranging from 0.01 to 1 part by weight per one hundred parts by weight of reactant. Tetrahydrothiophene-1,1-dioxide is employed as diluent in an approximate diluent:reactant weight ratio ranging from 5:1 to 1:5.

Process conditions will vary according to the particular reactant employed. In general, the process is conducted under conditions of temperature, pressure and time sufficient to effect the desired degree of reaction.

The temperature of the reaction determines to a substantial extent the range of hydrocarbons which will occur in the product. An increase in temperature generally increases the yield of higher oligomers. Reaction temperatures can range from about 25° to about 250°C. Temperatures within the range of 100° to 200°C. are presently preferred.

Reaction pressure can range from atmospheric up to about 5000 psig. When the process is conducted in a pressure vessel, such as an autoclave, reaction pressure can be autogenous although in some instances it may be desirable to pressurize the reactor with an inert diluent gas.

The time of reaction is determined by the desired degree of reaction, reactivity of the reactant and the temperature employed. The time of reaction can range from about 10 minutes to about 10 hours.

Following completion of the reaction period, the products can be separated from the reaction mixture using any convenient method such as decantation, fractionation, and the like. The diluent, catalyst, and unconverted feedstock can be recycled, if desired.

The oligomers produced in accordance with this invention can be used for many purposes well known in the art, for example, as chemical intermediates, as plasticizers, as comonomers in addition polymerizations and as lube oil additives.

The following examples illustrate this invention.

EXAMPLE I

To a 1-liter autoclave were charged 250 grams of tetrahydrothiophene-1,1-dioxide, 0.5 gram of iodine and isobutylene, in amounts shown below. The reaction mixtures were heated to 200°C. for 2 hours at autogenous pressure. At the end of 2 hours, the reaction vessel was cooled. Unreacted isobutylene, if any, was vented into an acetone-dry ice trap where it was recovered. The reaction mixture consisted of an upper hydrocarbon layer and a lower tetrahydrothiophene-1,1-dioxide layer.

Isobutylene conversion and yields of the dimer and trimer were determined by gas-liquid chromatographic (GLC) analysis of the two liquid layers. Identification of the components was made by comparison of GLC retention times to those of known compounds. The data are uncorrected; analysis was made by direct comparison of the areas under the curves without application of a sensitivity factor or an internal standard.

Results of two runs are given in Table I. The values for conversion and yield are based upon the amount of isobutylene consumed in the reaction.

TABLE I

| Run | Isobutylene Charged, Grams | Conversion, % | Yield Dimer,%[a] | Yield Trimer,%[b] |
|---|---|---|---|---|
| 1 | 280 | 99 | 49.6 | 40.9 |
| 2 | 291 | 96.5 | 50.9 | 39.5 |

[a]Approximate thermodynamic distribution of isomers: 80 percent 2,4,4-trimethyl-1-pentene; 20 percent 2,4,4-trimethyl-2-pentene.
[b]Three of the possible isomers were observed by GLC. The structures were not determined.

This example illustrates that dimers and trimers are produced in good conversion and yield according to the process of this invention.

EXAMPLE II

Two runs were conducted using the procedure of Example I with variations in reaction temperature. Results of these runs are given in Table II.

TABLE II

| Run | Isobutylene Charged, Grams | Temp. °C. | Conversion, % | Yield Dimer,%[a] | Yield Trimer,%[b] |
|---|---|---|---|---|---|
| 3 | 300 | 150 | 90.8 | 76.8 | 20.7 |
| 4 | 283 | 125 | 46.6 | 78.0 | 8.6 |

[a]Approximate thermodynamic distribution of isomers: 80 percent 2,4,4-trimethyl-1-pentene; 20 percent 2,4,4-trimethyl-2-pentene.
[b]Three of the possible isomers were observed by GLC. The structures were not determined.

This example illustrates that lower temperatures, as compared to Example I, promote formation of the dimers.

EXAMPLE III

For purposes of comparison, two runs were conducted using the general procedure of Example I, using Lewis acids as catalysts in place of iodine. One gram of catalyst was used. The reaction mixtures were heated to 150°C. for 2 hours. Results of these runs are shown in Table III.

TABLE III

| Run | Catalyst | Isobutylene Chgd. Grams | Conversion, % | Yield Dimer,%[a] | Yield Trimer,% |
|---|---|---|---|---|---|
| 5 | $AlCl_3$ | 302 | 0 | trace | — |
| 6 | $ZnCl_2$ | 315 | 23.7 | 38 | [b] |

[a]Approximate thermodynamic distribution of isomers: 80 percent 2,4,4-trimethyl-1-pentene; 20 percent 2,4,4-trimethyl-2-pentene.
[b]Not determined.

EXAMPLE IV

For further comparison a run was conducted following the general procedure of Example I, using diphenyl ether as the diluent in place of the tetrahydrothiophene-1,1-dioxide.

The reaction mixture was heated to 150°C. for 2 hours. After cooling, the reaction mixture was analyzed according to the general procedure given in Example I. Only a trace of dimer was found. The reaction did not occur to any appreciable extent.

Examples III and IV illustrate that the process of this invention is relatively inoperable in the absence of either iodine or tetrahydrothiophene-1,1-dioxide.

EXAMPLE V

Two runs were conducted essentially as described in Example I using propylene in place of isobutylene at temperatures of 125° and 200°C. for 3 hours. No reaction occurred to any appreciable extent in either run.

EXAMPLE VI

To a 1-liter round bottom flash equipped with magnetic stirrer, thermometer, and reflux condenser were charged 250 ml of tetrahydrothiophene-1,1-dioxide, 1.0 gram of iodine and 227 grams of alpha-methylstyrene. The mixture was stirred, under nitrogen, at a temperature of 150°C. for 2.5 hours. The reaction mixture was cooled, then diluted with 500 ml of water and extracted with ether. The combined ether extracts were washed successively with water, sodium bisulfite solution and water, then dried over anhydrous magnesium sulfate and filtered. The ether was removed by distillation at atmospheric pressure. Distillation of the residue at reduced pressure gave 163.1 grams of product identified by nmr, mass spectrometry, and IR spectrometry as 1,3,3-trimethyl-1-phenylindane. Yield 71.9%.

Reasonable variations and modifications of this invention will be apparent to those skilled in the art in view of this disclosure. Such variations and modifications are within the scope and spirit of the disclosure.

What is claimed is:

1. A process for the oligomerization of a monoalkenyl compound selected from the group consisting of
    A. compounds having from 4 to 20 carbon atoms per molecule characterized by the formula

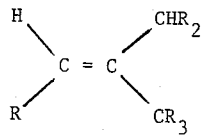

wherein each R is independently selected from the group consisting of hydrogen, alkyl, cycloalkyl and aryl; and
    B. compounds having from 8 to 20 carbon atoms per molecule characterized by the formula

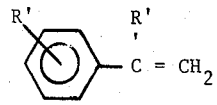

wherein each R' is independently selected from the group consisting of hydrogen, alkyl and cycloalkyl; which comprises contacting said monoalkenyl compound with a catalytic amount of elemental iodine in the presence of tetrahydrothiophene-1,1-dioxide as diluent under oligomerization conditions wherein said tetrahydrothiophene-1,1-dioxide is present in an approximate weight ratio of diluent to monoalkenyl compound ranging from 5:1 to 1:5, and the process temperature is in the approximate range of 25° to 250°C.

2. The process of claim 1 wherein said iodine is present in an approximate amount ranging from 0.01 to 1 part by weight per 100 parts by weight of said monoalkenyl compound.

3. The process of claim 2 wherein said monoalkenyl compound is an acyclic aliphatic 1-olefin having from 4 to 10 carbon atoms.

4. The process of claim 3 wherein said olefin is isobutylene.

5. The process of claim 2 wherein said monoalkenyl compound is an alpha-alkyl-substituted styrene having from 9 to 12 carbon atoms.

6. The process of claim 5 wherein said substituted styrene is alpha-methylstyrene.

* * * * *